(12) United States Patent
Lo

(10) Patent No.: US 8,805,179 B2
(45) Date of Patent: Aug. 12, 2014

(54) METHOD AND APPARATUS FOR COMPOSING 3D PHOTOGRAPHS

(71) Applicant: 3DV Co. Ltd, Hong Kong (CN)

(72) Inventor: Allen Kwok Wah Lo, Hong Kong (CN)

(73) Assignee: 3DV Co., Ltd., Chai Wan (HK)

( * ) Notice: Subject to any disclaimer, the term of this patent is extended or adjusted under 35 U.S.C. 154(b) by 0 days.

(21) Appl. No.: 13/928,885

(22) Filed: Jun. 27, 2013

(65) Prior Publication Data

US 2013/0287384 A1 Oct. 31, 2013

Related U.S. Application Data

(63) Continuation-in-part of application No. 12/931,564, filed on Feb. 3, 2011.

(51) Int. Cl.
*G03B 41/00* (2006.01)

(52) U.S. Cl.
USPC ....................................................... 396/322

(58) Field of Classification Search
USPC ................................................... 396/322
See application file for complete search history.

(56) References Cited

U.S. PATENT DOCUMENTS

| | | |
|---|---|---|
| 4,092,654 A | 5/1978 | Alasia |
| 4,120,562 A | 10/1978 | Lo et al. |
| 4,198,147 A | 4/1980 | Alasia |
| 4,814,826 A | 3/1989 | Fritsch |
| 4,903,069 A | 2/1990 | Lam |
| 5,408,294 A | 4/1995 | Lam |
| 5,583,971 A | 12/1996 | Lo |
| 5,717,844 A | 2/1998 | Lo et al. |
| 5,801,811 A | 9/1998 | Lo et al. |
| 5,801,812 A | 9/1998 | Lo et al. |
| 5,802,410 A | 9/1998 | Wah Lo et al. |
| 5,825,466 A | 10/1998 | Lo et al. |
| 5,850,278 A | 12/1998 | Lo et al. |
| 5,850,580 A | 12/1998 | Taguchi et al. |
| 6,233,035 B1 | 5/2001 | Toshiyuki et al. |
| 7,940,456 B2 | 5/2011 | Takagi et al. |
| 2003/0231880 A1 | 12/2003 | Irving et al. |
| 2009/0195873 A1 | 8/2009 | Kubara |

*Primary Examiner* — Rodney Fuller

(57) ABSTRACT

A 3D photographic printer uses a digital display device for displaying two or more images for composing a 3D photograph. The images are displayed at different locations so that these images can be projected onto a 3D print material through a projection lens at different projection angles. With the digital display device, it is possible to electronically locate the images at different locations and shift the images or mechanically moving the display device during the 3D photographic composing process. It is also possible that only the print material is mechanically shifted to different locations. The display device and the projection lens can be stationary. The display device can have a monochrome LCD panel and a color light source for illuminating the LCD panel for printing.

18 Claims, 18 Drawing Sheets

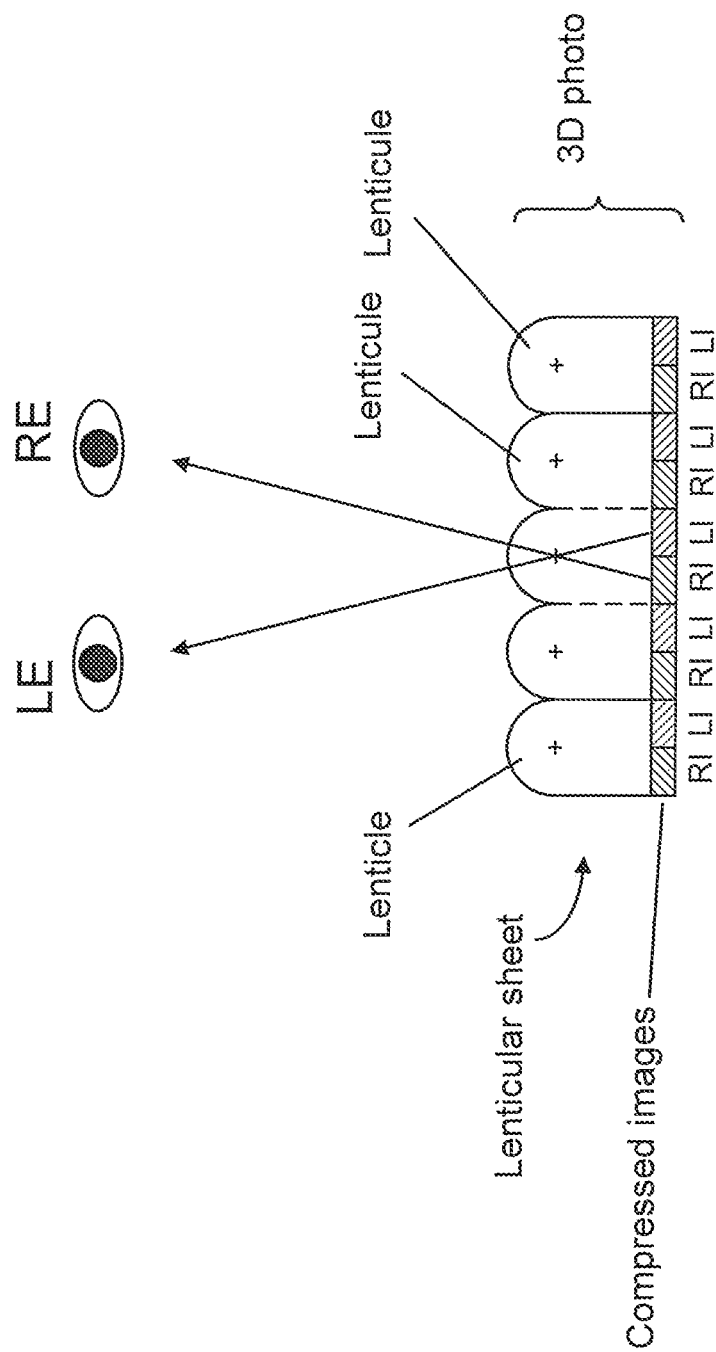

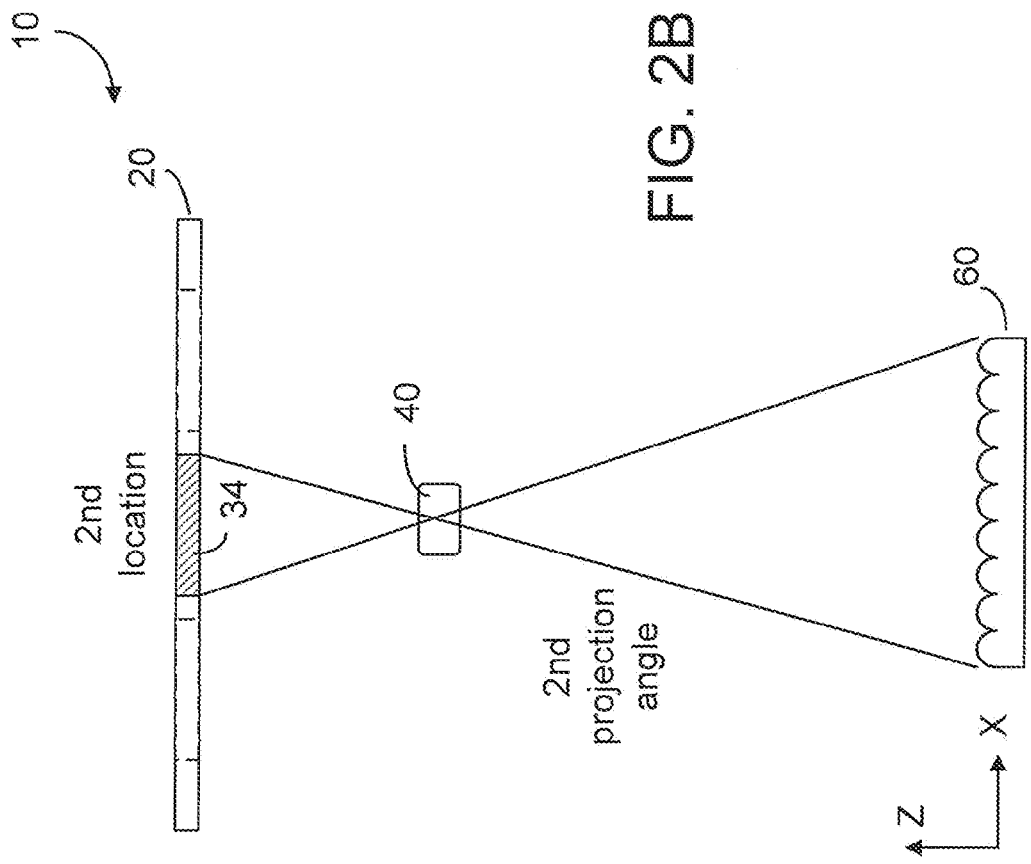
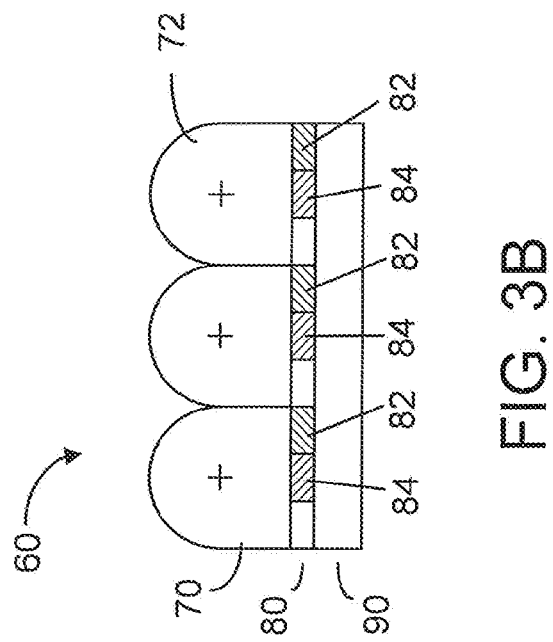

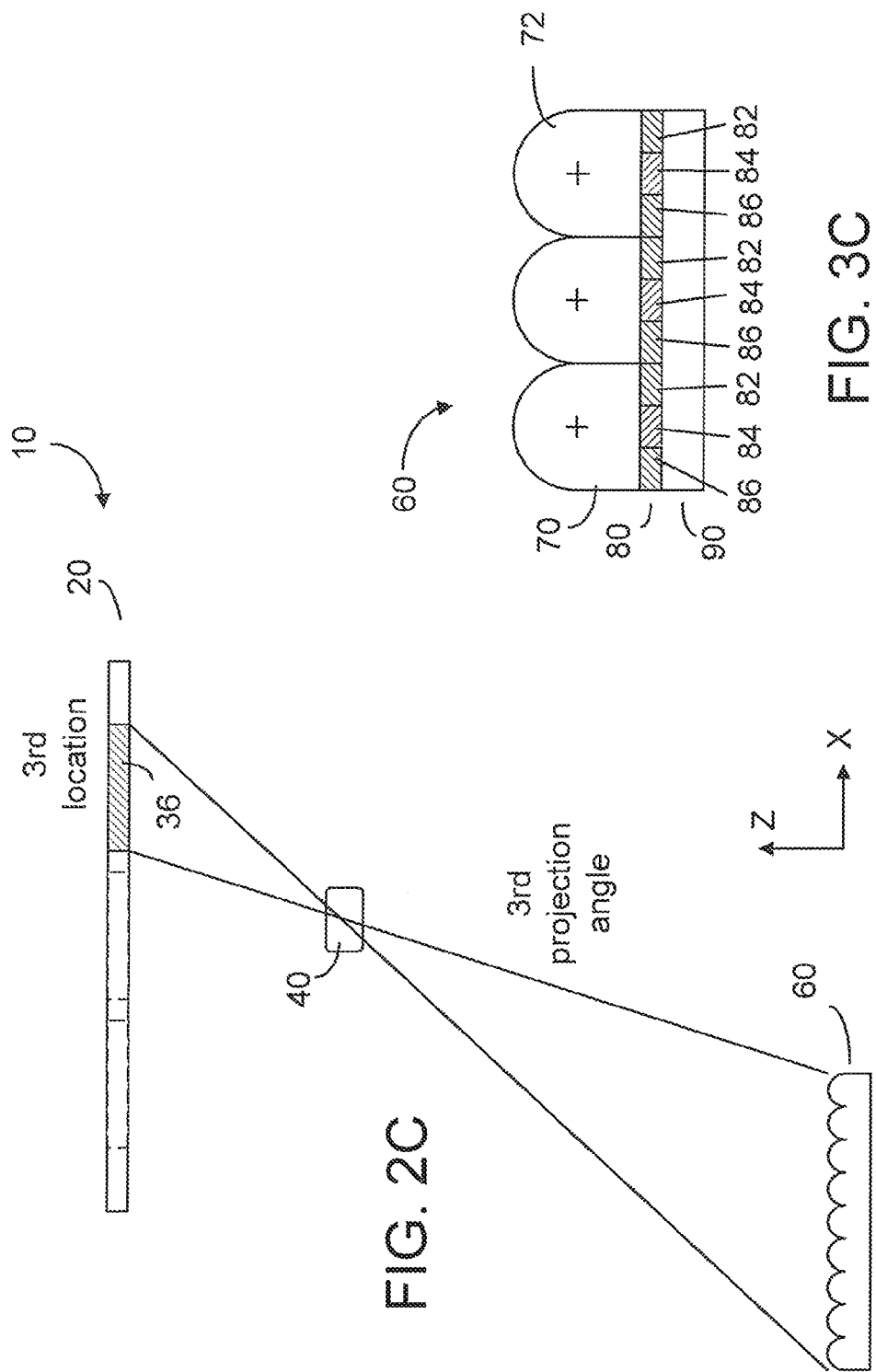

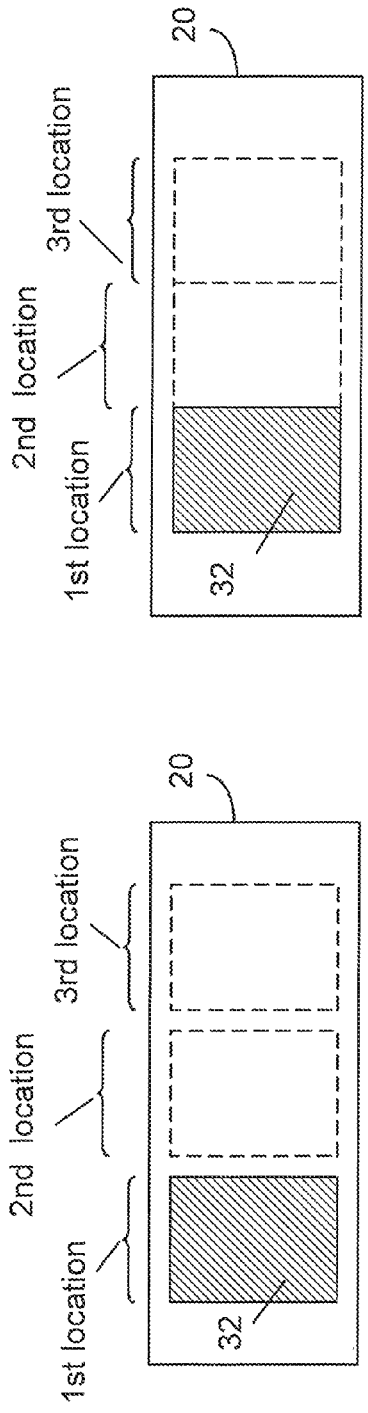
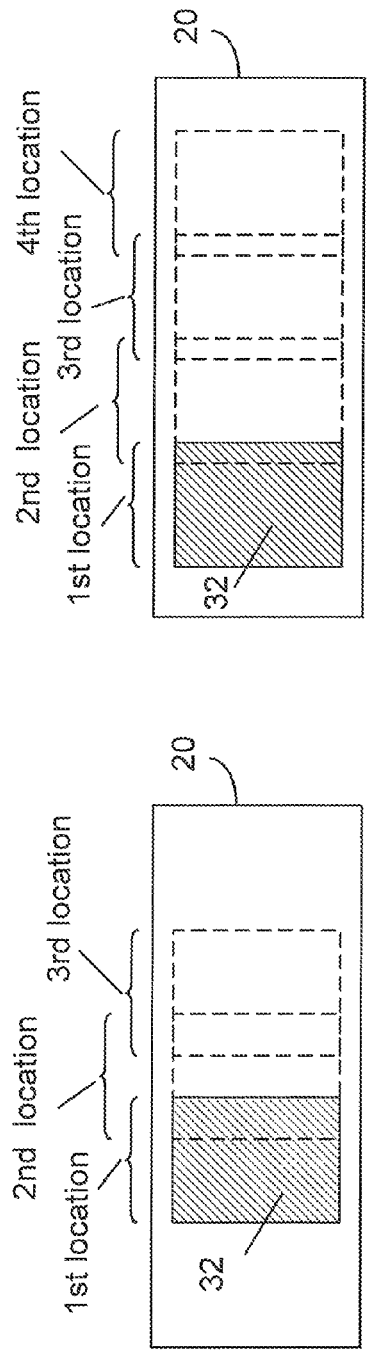
FIG. 6A  FIG. 6B  FIG. 6C  FIG. 6D

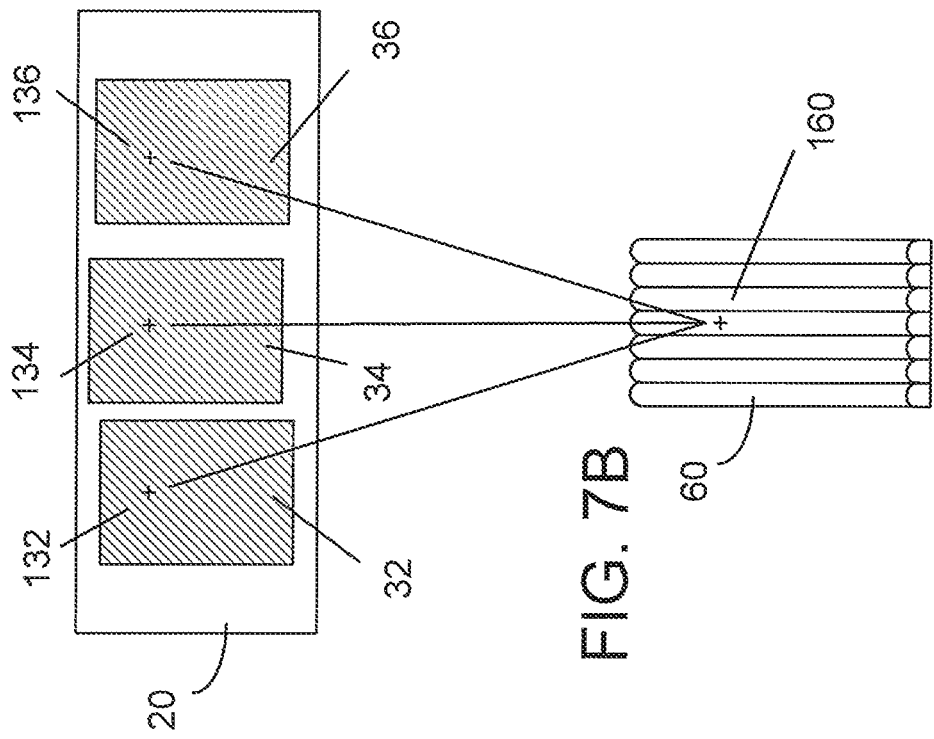
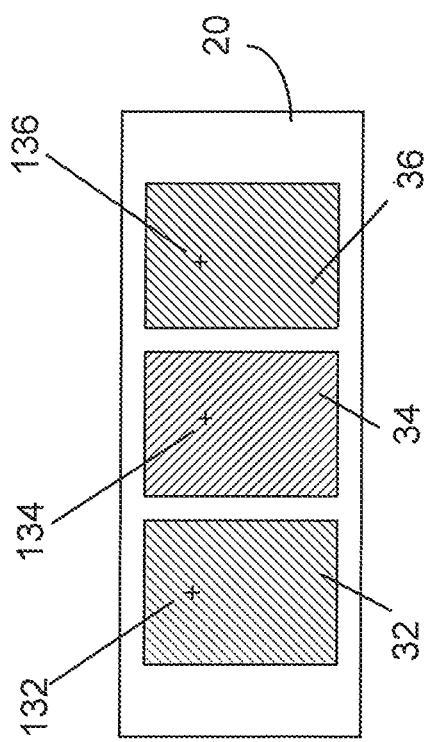

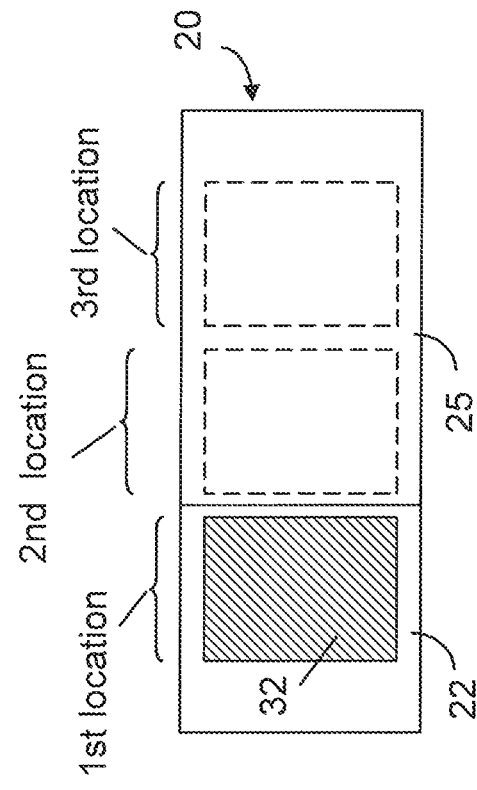
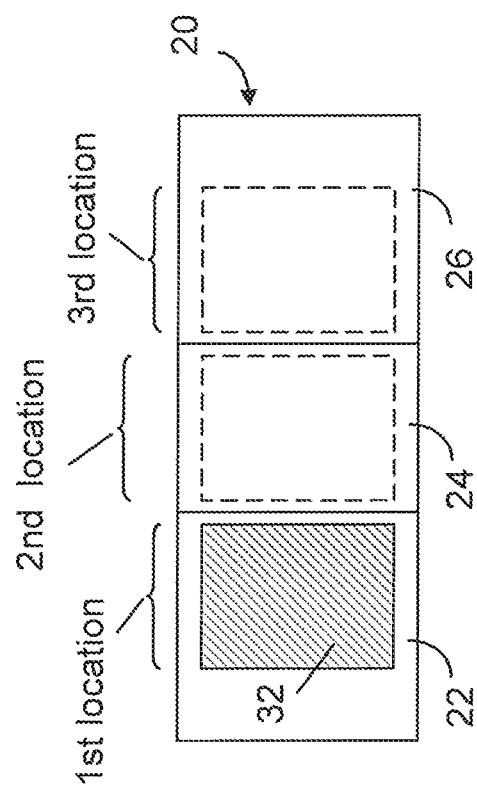

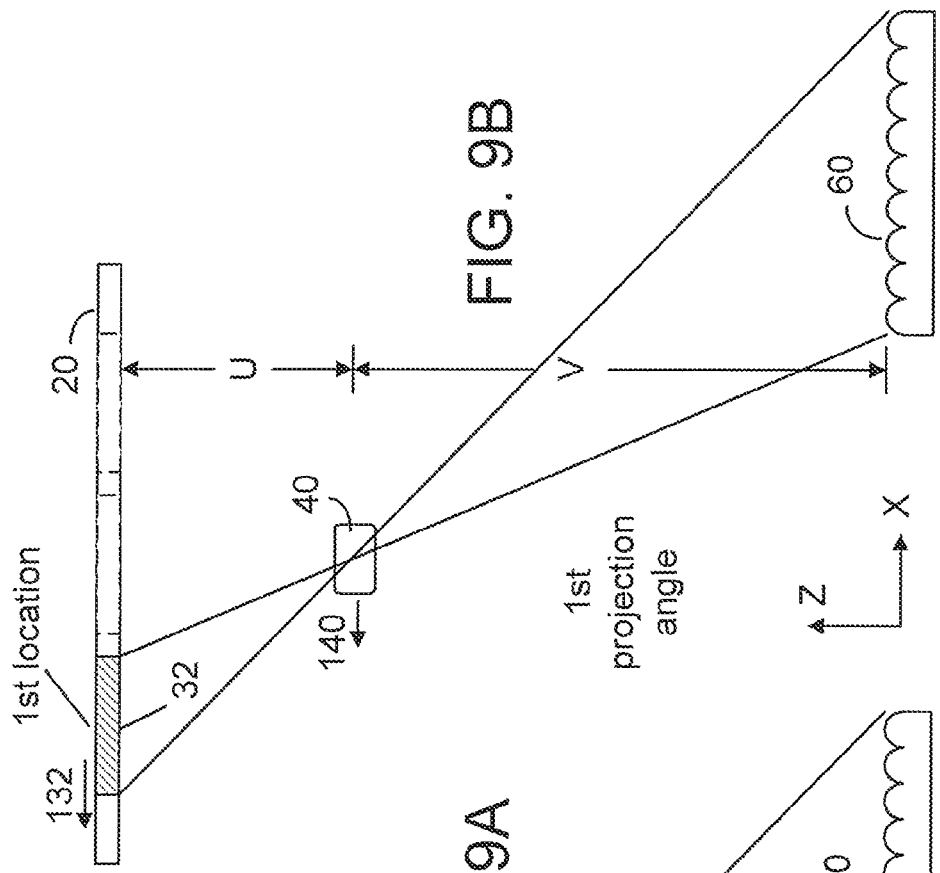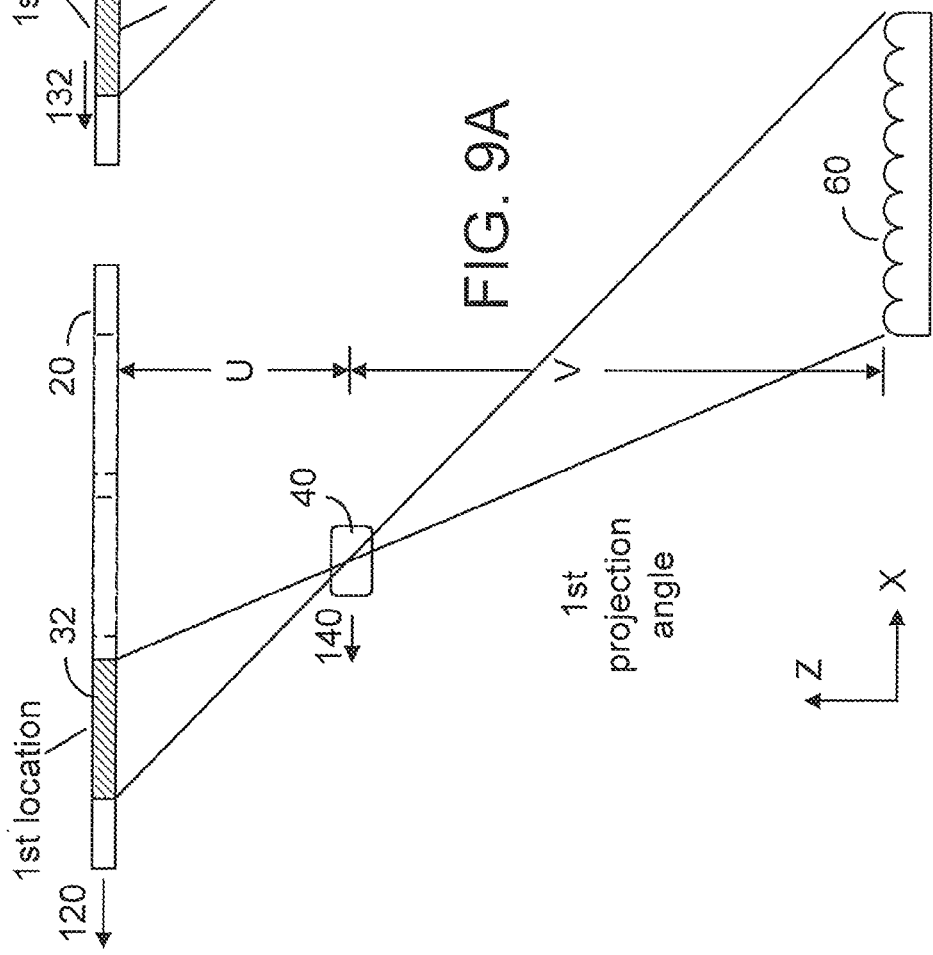

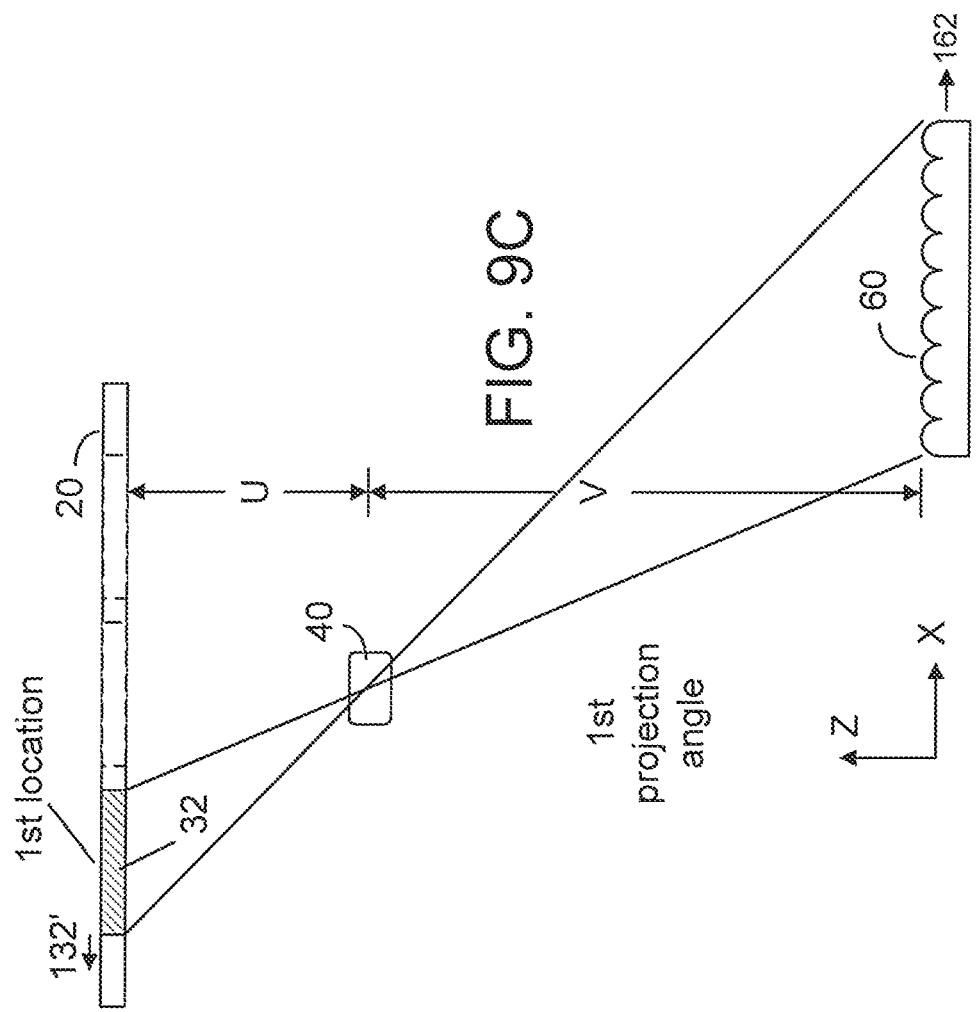

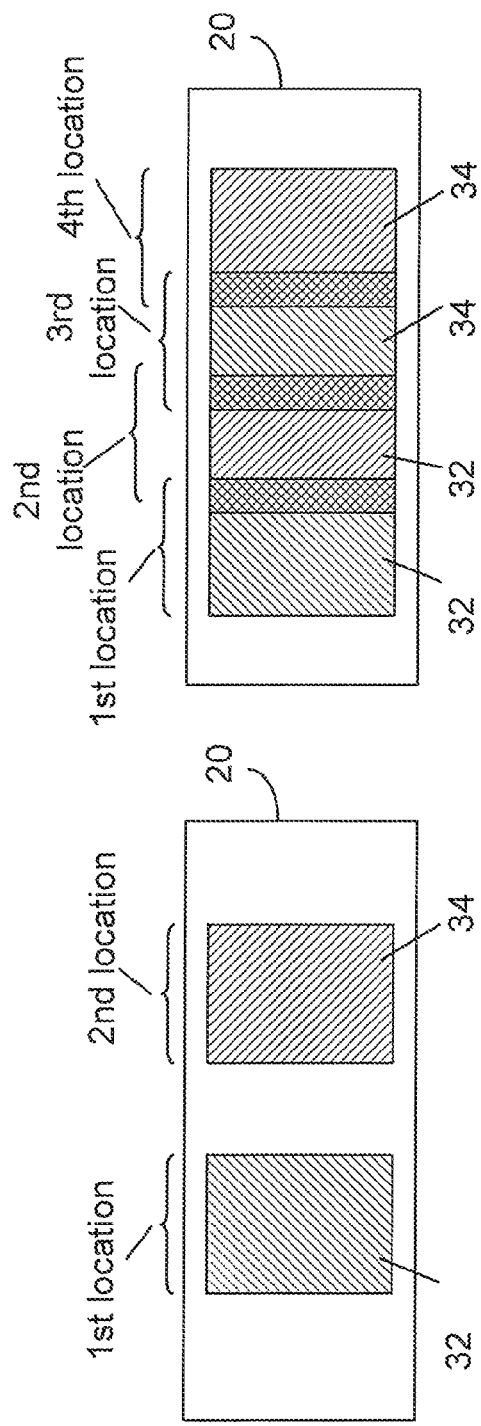
FIG. 10A
FIG. 10B
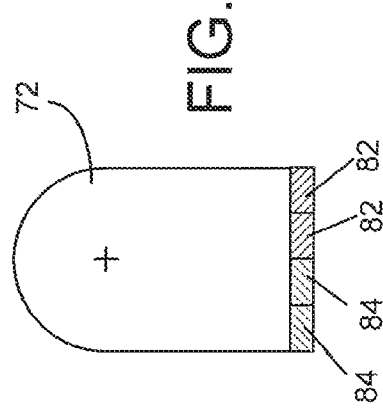
FIG. 10C

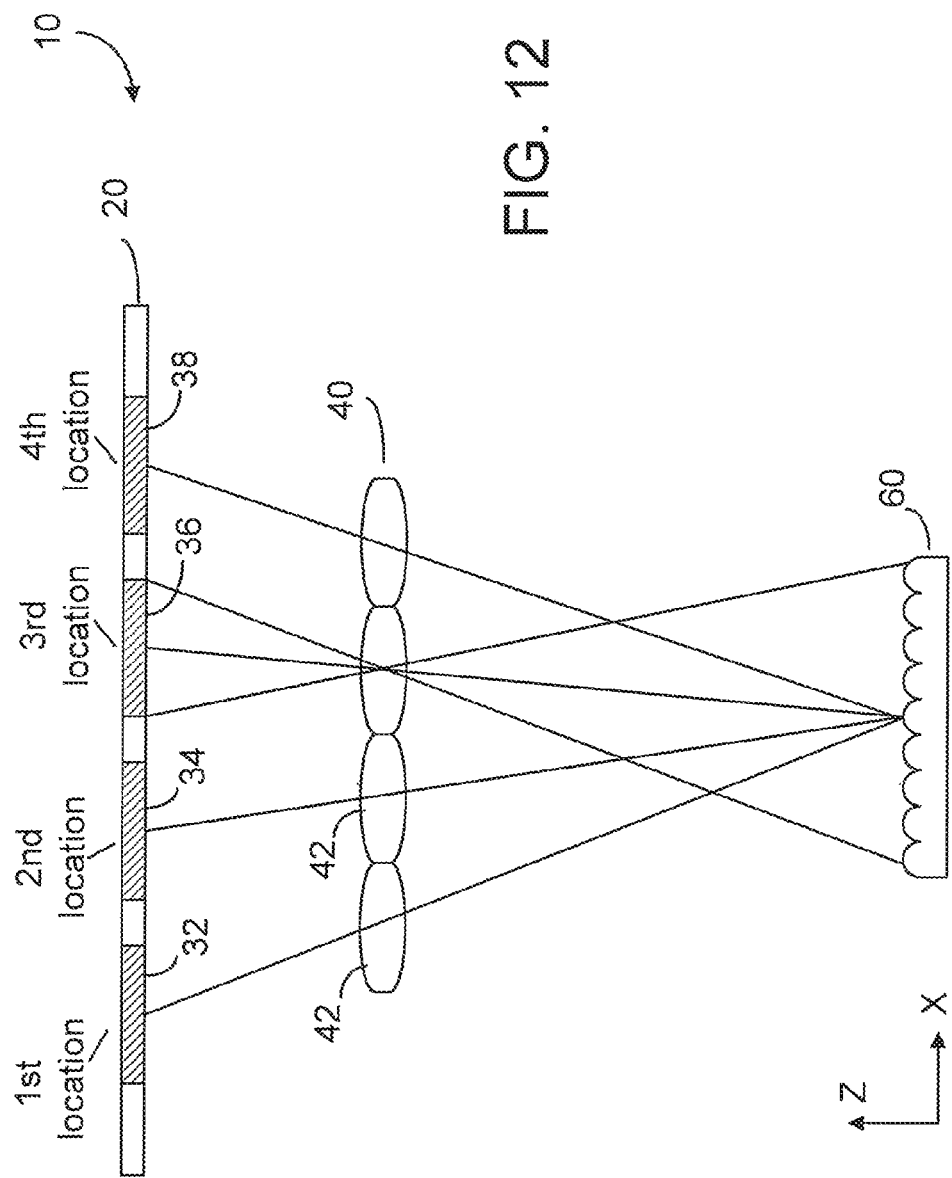

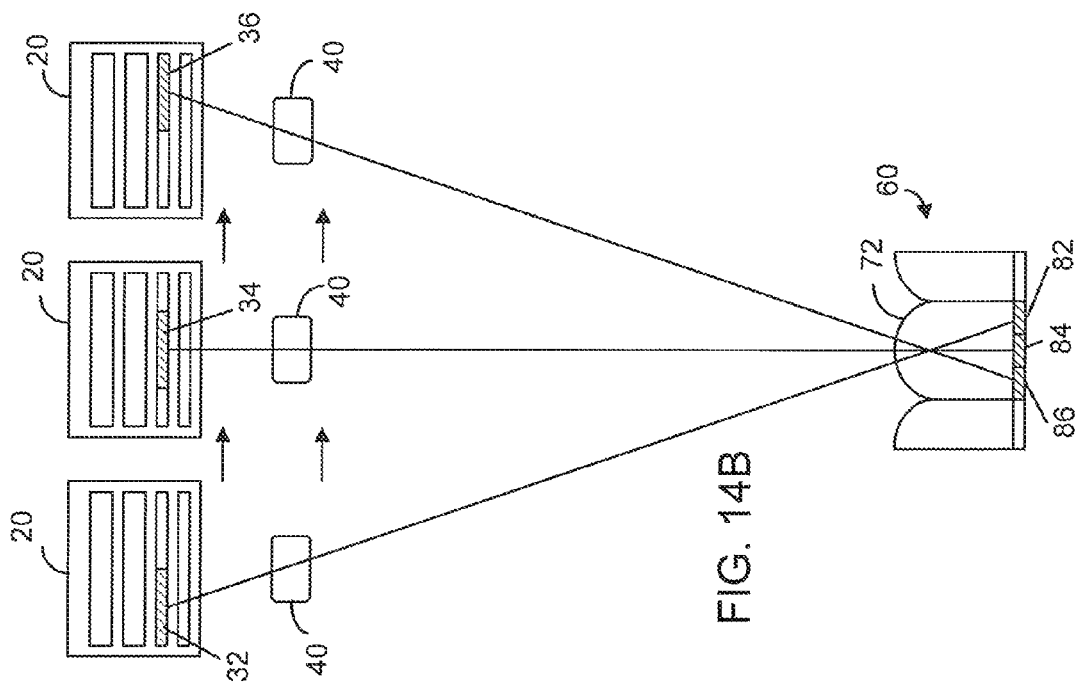
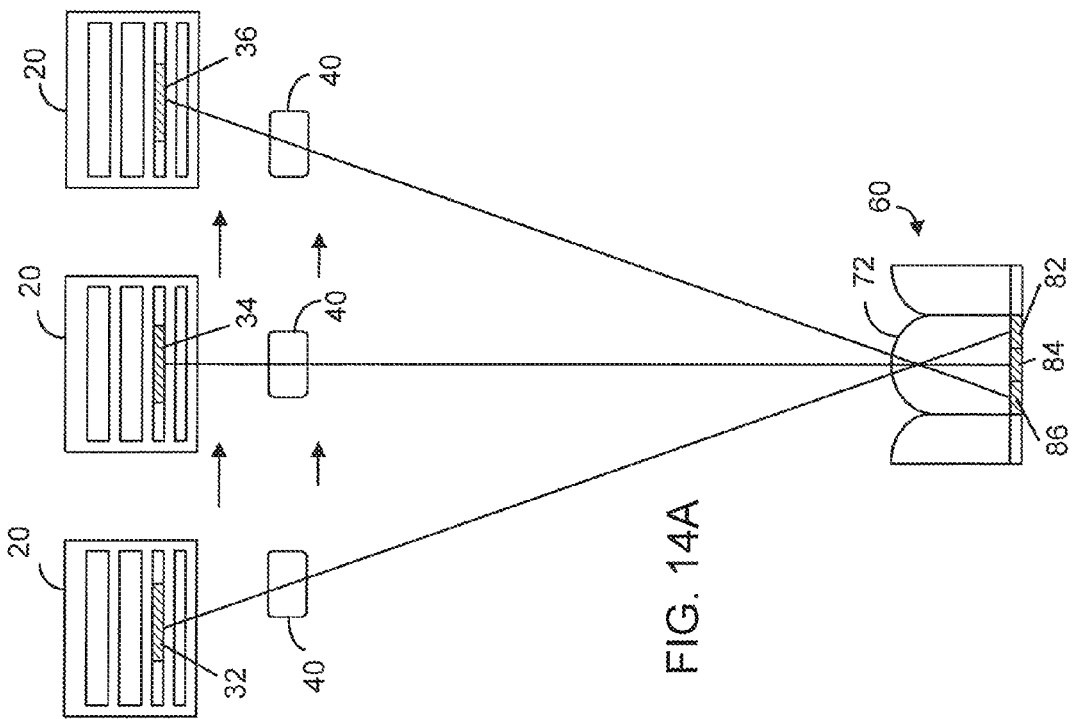

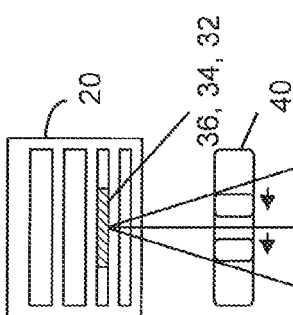
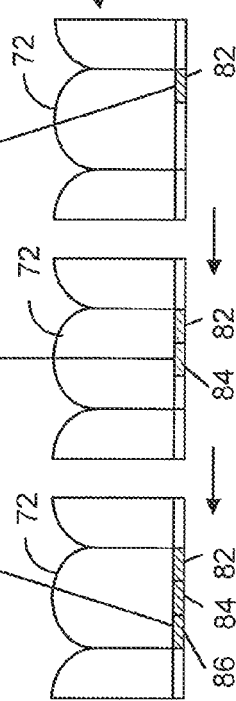
FIG. 14C
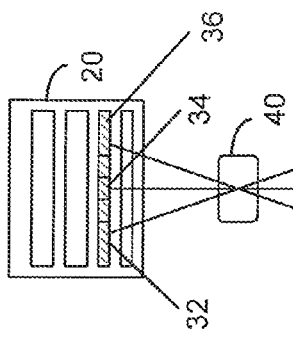
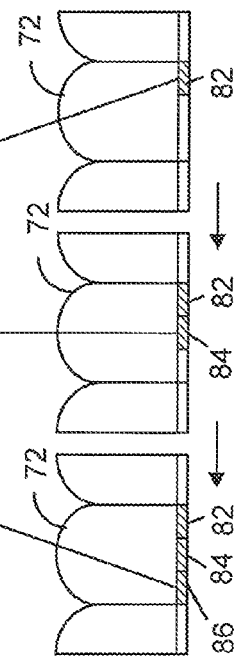
FIG. 14D

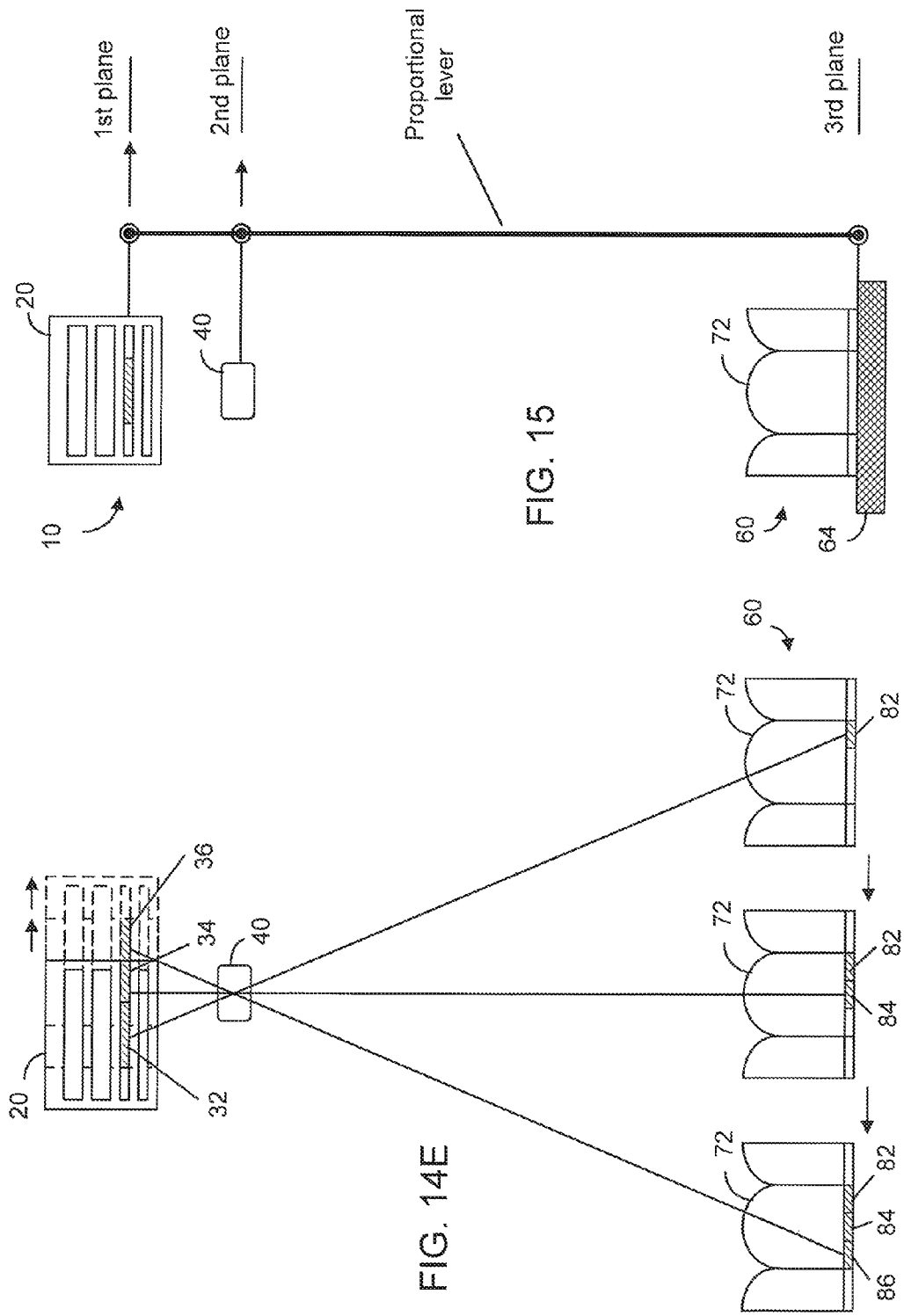

METHOD AND APPARATUS FOR COMPOSING 3D PHOTOGRAPHS

CROSS REFERENCE TO RELATED APPLICATION

This application is a Continuation-In-Part Application of and claims priority to U.S. patent application Ser. No. 12/931,564, filed Feb. 3, 2011.

FIELD OF THE INVENTION

The present invention relates generally to 3D photographic printing and, in particular, to an optical method for composing 3D photos.

BACKGROUND OF THE INVENTION

A lenticular-typed 3D photograph has a lenticular sheet disposed on top of an image sheet. On the image sheet, a plurality of compressed images are formed in an interleaving manner. In the simplest form, the compressed images are composed of two views, a right view and a left view. As shown in FIG. 1, the compressed images of the left view are denoted as LI, and the compressed images of the right view are denoted as RI. When the compressed images are aligned with the lenticules disposed on top of the image sheet, the lenticules separate the left view from the right view. As such, the left eye (LE) of a viewer can only see the left view and the right eye (RE) can only see the right view. If the left view and the right view are the images of a scene taken at two different angles, what the viewer sees from the 3D photo is a three-dimensional picture of the scene.

SUMMARY OF THE INVENTION

The present invention provides a method and apparatus for composing a 3D photograph from two or more images. According to various embodiments of the present invention, the images are displayed at different locations on a digital image display device so that these images can be projected onto a 3D print material through a projection lens or optical image forming device at different projection angles.

Thus, the first aspect of the present invention is a method for producing a 3D picture. The method comprises:

arranging a digital display device comprising an image display area on a first plane;

arranging an optical image forming device on a second plane spaced from the first plane;

receiving digital image data in the digital display device; and displaying a plurality of images on the image display area for forming a plurality of projected images on a print material through the optical image forming device, wherein said plurality of images are indicative of the digital image data, and each of said plurality of projected images is caused to form on the print material at different projection angles, wherein the print material is located on a third plane spaced from the second plane and substantially parallel to the first plane, such that the second plane is located between the first plane and the third plane.

In one embodiment of the present invention, the method further comprises:

shifting the print material on the third plane for achieving the different projection angles; and the digital display device remains stationary relative to the optical image forming device.

In another embodiment of the present invention, the method comprises shifting the optical image forming device on the second plane and shifting the images on the first plane relative to the print material for achieving different projection angles.

In embodiments of the present invention, each of the plurality of projected images comprising an alignment point, the method further comprises shifting at least one of the plurality of images on the image display area such that the plurality of projected images area are aligned on the print material at the alignment point.

In embodiments of the present invention, the digital display device comprises a liquid crystal display device comprising the image display area and a light source, and the method further comprises arranging the light source to provide illumination to the image display area for forming each of said plurality of projection images.

In embodiments of the present invention, each of the images comprises a plurality of color image components, wherein the liquid crystal display device comprises a monochrome display panel arranged to display one of the plurality of color image components at a time and wherein the light source comprises a plurality of color light components corresponding to the color image components. The method further comprises selecting a corresponding one of the plurality of color light components to illuminate the monochrome display panel for a predetermined exposure period when the monochrome display panel displays one of the color image components. The plurality of color image components may comprise a red image component, a green image component and a blue image component and the corresponding color light components comprise a red light component, a green light component and a blue light component. The light source may comprise light-emitting components arranged to emit light for providing the color light components.

In embodiments of the present invention, the monochrome display panel comprises a plurality of discrete pixels and each of said plurality of the projected images formed on the print material comprises image dots corresponding to the discrete pixels, said method further comprising optically widening the image dots.

In one embodiment of the present invention, the illumination provided to the image display area is arranged to form an image forming light beam through the optical image forming device for forming each of said plurality of projected images, and the optical widening comprises arranging a sheet of optical material between the digital display device and the print material, and mechanically moving the sheet of optical material in a predetermined manner while the illumination is provided to the image display area so as to shift the image forming light beam.

In embodiments of the present invention, the print material comprises a plurality of lenticules, each of the lenticules having a lenticule base, and wherein each of the projection images is caused to form a different compressed image having a compressed image width at a different section of the lenticule base, and the method further comprises adjusting each of the different projection angles for extending the compressed image width at the different section of the lenticule base. The adjusting may comprise shifting at least two of the digital display device, the optical image forming device and the printed material. The adjusting may comprise mechanically shifting one or both of the optical image forming device and the printed material and electronically shifting the images on the image display area.

In different embodiment of the present invention, the method further comprises mechanically shifting at least two of the digital display device, the optical image forming device and the printed material for achieving the different projection angles, and/or mechanically shifting one or both of the optical image forming device and the printed material and electronically shifting the images on the image display area for achieving the different projection angles.

In embodiments of the present invention, the print material comprises a lenticular sheet having a first side facing the optical image forming device and an opposing second side, and a photosensitive layer adjacent to the second side, said method further comprising causing the photosensitive layer to form latent images of said plurality of projected images; and chemically processing the print material for changing the latent images to visible images.

In one embodiment of the present invention, the optical image forming device comprises a single aperture, said method further comprising adjusting the single aperture such that each of the projected images is formed through said single aperture.

The second aspect of the present invention is a 3D printing system or an apparatus for composing a 3D photograph. The apparatus comprises:

a digital display device comprising an image display area located on a first plane;

an optical image forming device located on a second plane spaced from the first plane, wherein the digital display device is configured to receive digital image data, and the image display area is configure to display a plurality of images indicative of the digital image data for forming a plurality of projected images on a print material through the optical image forming device, each of the project images is formed at a different projected angle; and a holder configured to hold the print material on a third plane spaced from the second plane and substantially parallel to the first plane such that the second plane is located between the first plane and the third plane, wherein a mechanical shifter arranged to shift the holder on the third plane for changing the projection angle.

The apparatus further comprises a data driver configured to provide to the digital display device digital image data indicative of the plurality of images. The plurality of images can be photographic images of a scene taken at different viewing angles, or one or more computer graphic images, or one or more text images.

In one embodiment of the present invention, the digital display device comprises a liquid crystal display device having the image display area and a light source arranged to illuminate the image display area.

In one embodiment of the present invention, each of the images comprises a plurality of color image components and the liquid crystal display device comprises a monochrome display panel arranged to display one of the color image components at a time. The light source comprises a plurality of color light components corresponding to the color image components, such that when one of the color image components is displayed on the monochrome display panel, the corresponding one of the color light components is arranged to illuminate the monochrome display panel for a predetermined exposure period. The color light components can be light-emitting components or light-emitting diodes, for example.

The digital display device can be composed of one or more display panels.

The present invention will become apparent upon reading the description taken in conjunction with FIGS. 2A to 18.

BRIEF DESCRIPTION OF THE DRAWINGS

FIG. 1 shows a typical lenticular-typed 3D picture.

FIGS. 2A to 2C show a 3D photo composing process, according to one embodiment of the present invention.

FIGS. 3A-3C show the compressed images under the lenticules at various composing stages.

FIG. 6A shows three images are displayed at three different locations on the display device, according to one embodiment of the present invention.

FIG. 6B shows three images are displayed at three different locations on the display device, according to another embodiment of the present invention.

FIG. 6C shows three images are displayed at three different locations on the display device, according to yet another embodiment of the present invention.

FIG. 6D shows four images are displayed at four different locations on the display device.

FIG. 7A shows a possible misalignment of three displayed images for composing a 3D photo.

FIG. 7B shows the shifting of the displayed images for alignment.

FIG. 8A shows a display device, according to one embodiment of the present invention.

FIG. 8B shows a display device, according to another embodiment of the present invention.

FIG. 9A shows a method for filling the gaps in the compressed images, according to one embodiment of the present invention.

FIG. 9B shows a method for the filling the gaps in the compressed images, according to another embodiment of the present invention.

FIG. 9C shows a method for the filling the gaps in the compressed images, according to yet another embodiment of the present invention.

FIGS. 10A and 10B illustrate a method for filling the gaps in the compressed images, according to yet another embodiment of the present invention.

FIG. 10C illustrates filling the gaps in the compressed images with repeated images.

FIG. 12 shows a different embodiment of the 3D photographic printer, according to the present invention.

FIGS. 14A-14E illustrate different methods for forming a plurality of projected images at different projection angles.

FIG. 15 illustrates a mechanical linkage for shifting two of the printer components for printing.

DETAILED DESCRIPTION OF THE INVENTION

As shown in FIG. 1, in composing a lenticular-typed 3D photo, the photosensitive emulsion under the lenticular screen or sheet must be exposed so that the compressed images of different views substantially fill the base of each lenticule. FIG. 1 shows a 3D photo wherein the compressed images of two views are used to fill the entire base of the lenticules. In general, a 3D photo can be composed of the compressed images of two, three, four or more different views. Depending on the optical resolution of a 3D photo, tens or hundreds of different views can be presented in the form of compressed images.

Figure 2A:
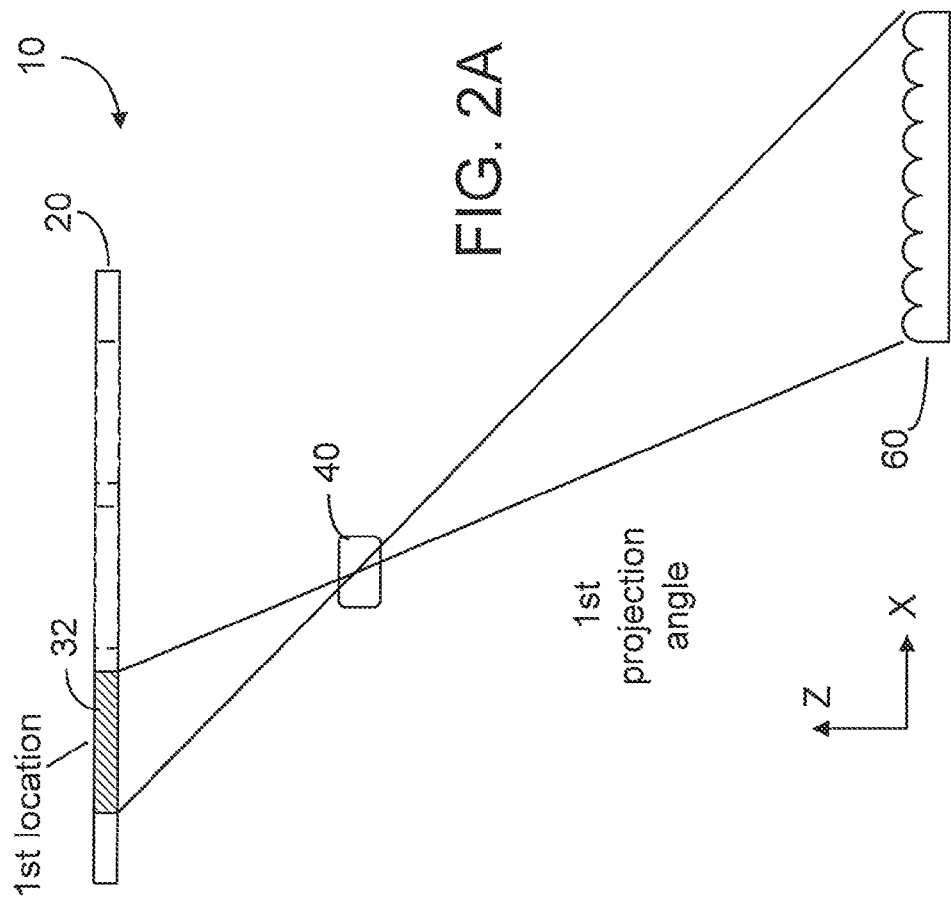
Figure 3A:
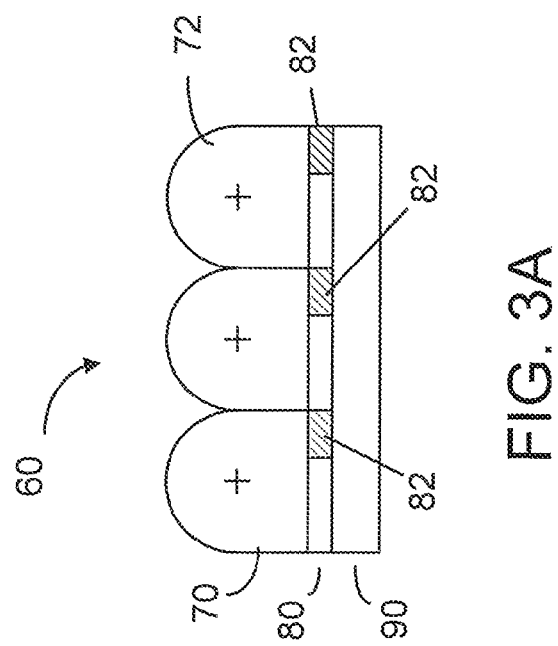

To disclose the present invention, a 3D photo composed from three views is used for illustrating the method and apparatus for composing a 3D photo. According to various embodiments of the present invention, an apparatus 10 is used to make a 3D photo. The apparatus 10 comprises a digital image display device 20, an optical image forming device 40 and a holder to hold a printer material 60, as shown in FIGS. 2A-2C. As shown in FIGS. 3A-3C, the print material 60 comprises a lenticular screen 70, a photosensitive emulsion 80 and a substrate, a piece of paper, or a coating 90 to support the emulsion 80. The lenticular screen 70 comprises a plurality of cylindrical lenses known as lenticules 72 for compressing a projected image into compressed images 82, 84, .... The digital display device 20 can be a liquid crystal display (LCD) panel, a light-emitting diode (LED) panel, a plasma display panel or any display panel configured to receive digital image data and display the digital image data as images at different display locations. The digital display device 20 is capable of displaying two or more images at a number of different display locations. The images can be displayed sequentially during the 3D photo composing process. If the images are displayed in non-overlapped locations, the display device can be arranged to simultaneously display those images at different locations.

Figure 5:
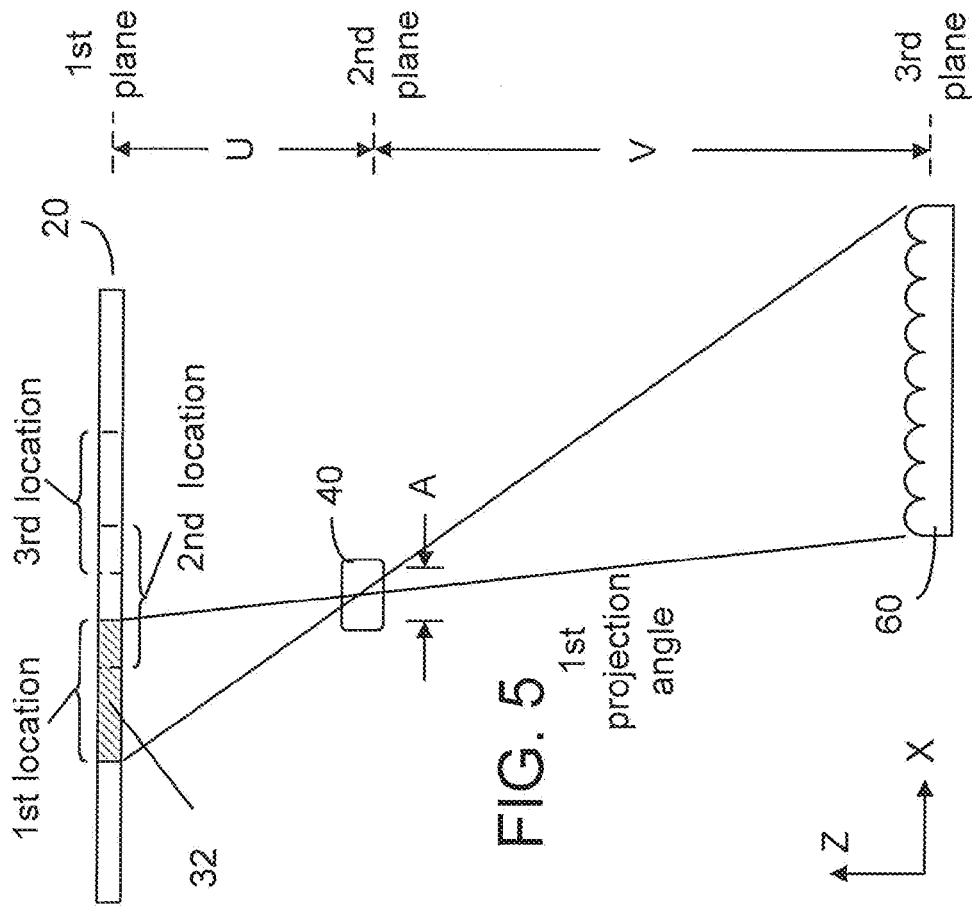
FIG. 5 shows a 3D photo composing process, according to another embodiment of the present invention.

Throughout the disclosure, the display device 20 is described as being placed on a first plane, the print material 60 is placed on a third plane and the optical image forming device is located on a second plane between the first plane and the third plane (see FIG. 5). The first plane and the third plane are substantially parallel to each other and to an XY plane (see FIGS. 11A and 11B). Thus, the first plane and the third plane are also substantially perpendicular to the Z axis (see FIGS. 2A-2C). In some embodiments of the present invention, the optical image forming device is required to be moved laterally in a second plane, which is substantially parallel to the first plane (see FIGS. 5, 9A and 9B, for example).

FIG. 2A shows the arrangement of the printing apparatus 10 when the first image 32 is displayed at the first location on the display device 20 in order to project the image through the optical image forming device 40 onto the print material 60 at a first projection angle. At the first projection angle, the projected image on the print material 60 is compressed into a plurality of compressed images 82 on the base the lenticules 72 of the lenticular screen 70, as shown in FIG. 3A. While keeping the display device 20 and the optical image forming device 40 stationary, the print material 60 is laterally shifted and the image 34 is displayed at a second location on the display device 20 so that the image 34 can be projected onto the print material 60 at a second projection angle, as shown in FIG. 2B. At this second projection angle, the projected image on the print material 60 is compressed into a plurality of compressed images 84 on the base the lenticules 72 of the lenticular screen 70, as shown in FIG. 3B. While keeping the display device 20 and the optical image forming device 40 stationary, the print material 60 is laterally shifted again and the image 36 is displayed at a third location on the display device 20 so that the image 36 can be projected onto the print material 60 at a third projection angle, as shown in FIG. 2C.

At this third projection angle, the projected image on the print material 60 is compressed into a plurality of compressed images 86 on the base of the lenticules 72 of the lenticular screen 70, as shown in FIG. 3C.

Figure 4:
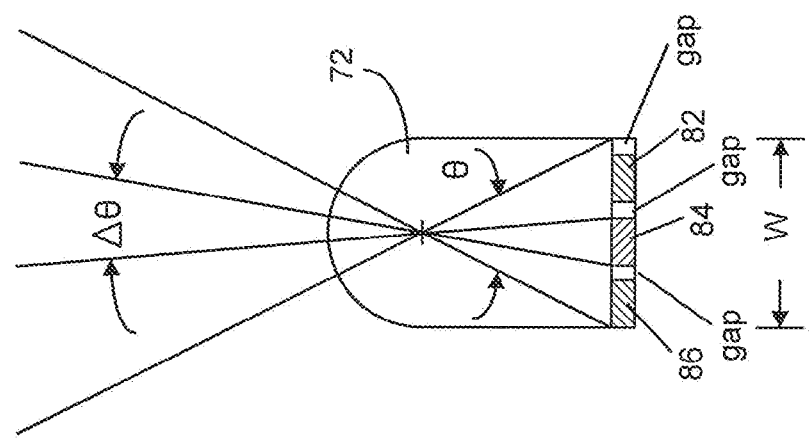
FIG. 4 shows the compressed images in relation to the width of the lenticule and the aperture of the enlarging lens.

It should be noted that, depending on the angle θ of the lenticule as shown in FIG. 4, the compressed images 82, 84 and 86 may or may not be able to cover the entire base (W) of the lenticules 72. The width of the compressed images is determined by Δθ, which is determined by the aperture A of the optical image forming device 40 and the distance V, as shown in FIG. 5. The total lenticular angle θ of a lenticule is determined by the geometry of the lenticule. As shown in FIG. 5, the display device 20 is located on a first plane, the print material 60 is located on a third plane, which is substantially parallel to the first plane. The optical image forming device (or enlarging lens/lenses) 40 is located on a second plane between the first plane and the third plane. In order to project the images onto the print material 60 at different projection angles, the print material is shifted to different locations on the third plane. As shown in FIG. 5, U is the distance between the first plane and the second plane and V is the distance between the third plane and the second plane. Thus, the magnification of the projection is V/U and the optical image forming device 40 is effectively an enlarging lens. Depending on the total lenticular angle θ and the compression angle Δθ (FIG. 4), the aperture A of the optical image forming device 40 can be adjusted to suit the number of images to be projected onto the print material 60. Furthermore, depending upon the number of images to be projected and the aperture of the enlarging lens the total lenticular angle θ, the different locations on the display device 20 may be overlapped with each other (FIGS. 5, 6B) or separated from each other (FIGS. 2A-2C, 6A). In some cases, the different locations of the second image are adjacent to each other as shown in FIG. 6C. When three images are used to compose a 3D image, the three images can be images of a scene taken at three different angles, by one or more cameras or created graphics. However, the three images to be exposed onto the print material can be unrelated images or texts or graphic arts, or the combination thereof.

A 3D photo can be composed of the compressed images of more than three images. The number of images used in composing a 3D picture or photograph can range from two to 100 or more, depending on the resolution of the lenticules, for example. As shown in FIG. 6d, four images are displayed at four different locations on the display device 20 in order to achieve four different projection angles. In this case, all four images displayed at four different locations can be four different views. However, it is possible that the images displayed at the first and second locations are the same right view and the images displayed at the third and fourth locations are the same left view so as to compose a 3D photo as shown in FIG. 1.

It should be noted that, when one views a 3D photo, some objects in the photo may appear in the plane of the photo, some objects may appear behind the plane of the photo and some in front of the plane of the photo. When composing a 3D photo, one of the objects that will appear on the plane of the photo is selected as the key subject. For example, when composing a 3D photo of a scene of a person located between some background and some foreground objects, the person may be selected as the key subject of the 3D photo. The key subjects in the images to be projected onto the print material must be aligned so that the projected images of the key subject will be located substantially at one point on the print material. This image alignment process is referred to as key-subject alignment. For example, three images 32, 34 and 36 are displayed sequentially or simultaneously at three different locations on the display device 20 in order to compose a 3D photo as shown in FIG. 7*a*. The key subjects 132, 134 and 136 in these three images may not be aligned such that the projected images of the key subject are located at the same point 160 on the print material 60 (FIG. 7B). In that case, it would be necessary to shift the displayed images for key subject alignment purposes. As shown in FIG. 7B, the displayed image 34 has been shifted upward and to the left and the displayed image 36 has been shifted upward for alignment purposes. According to one embodiment of the present invention, the shifting of the displayed images 34 and 36 from the locations as shown FIG. 7A to FIG. 7B can be carried out electronically, rather than mechanically. Thus, during the entire composition process, the display device 20 and the optical image forming device 40 can be kept stationary relative to each other and the key subject alignment process can be achieved by shifting one or more displayed images digitally or electronically.

In one embodiment of the present invention, the display device 20 comprises a single display panel as shown in FIG. 6A. As such, the single display panel has sufficient display area to display two or more images at two different locations sequentially or simultaneously. In another embodiment of the present invention, the display device 20 comprises two or more display panels as shown in FIG. 8A. As shown in FIG. 8A, the display device 20 comprises three display panels 22, 24 and 26, each of which is used to display one image. In a different embodiment, the display device comprises two or more display panels, but one or more display panels can be used to display more than one image. As shown in FIG. 8B, while the display panel 22 is used to display one image at one the first location, the display panel 25 can be used to display images at the second and third locations.

As shown in FIG. 4, the compressed images 82, 84 and 86 cannot fill the entire base of the lenticule 72, leaving some gaps or blanks in the 3D photo. This will affect the quality of the 3D photo. It may be possible to fill in the gaps by a number of ways. One is to widen the aperture of the optical image forming device. In one embodiment of the present invention, the aperture of the optical image forming device 40 is effectively widened by laterally shifting the optical image forming device 40 relative to the print material 60. As shown in FIG. 9A, the optical image forming device 40 is shifted by a distance 140 while the display device 20 is laterally shifted by a distance 120. The ratio of the distance 120 to the distance 140 is equal to (U+V)/V. The increase in $\Delta\theta$ is equal to the distance 140 divided by V. In a different embodiment of the present invention, instead of shifting the display device 20 by a distance 120, the displayed image 32 is electronically shifted by the distance 132 while the optical image forming device 40 is laterally shifted by a distance 140. As shown in FIG. 9B, the image shifting distance 132 is equal to the device shifting distance 120. As such, there is no need to mechanically move the display device 20 during the entire composing process. It is understood that one or more of the other displayed images may also be mechanically or electronically shifted along with the shifting of the optical image forming device 40 for gap filling purposes. In a different embodiment, instead of shifting the optical image forming device 40 by a distance 140, the print material 60 is shifted by a distance 162, which is equal to the distance 140 but in an opposition direction, as shown in FIG. 9C. Furthermore, the displayed image on the display device 20 is shifted by a distance 132' which is substantially equal to the distance 132 minus the distance 140 (see FIG. 9B). As such, there is no need to mechanically move the optical image forming device 40. The gap-filling method, as shown in FIG. 9C, is, in principle, equivalent to the method as shown in FIG. 10B. It should be noted that, FIGS. 9A-9C illustrate various methods for filling the gap in the base of the lenticules when a first displayed image 32 is exposed onto the print material 60 (see FIG. 2A). These methods can also be used to fill the gap when a second displayed image 34 and a third displayed image 36 are exposed onto the print material 60 as shown in FIGS. 2B and 2C.

Figure 11A:
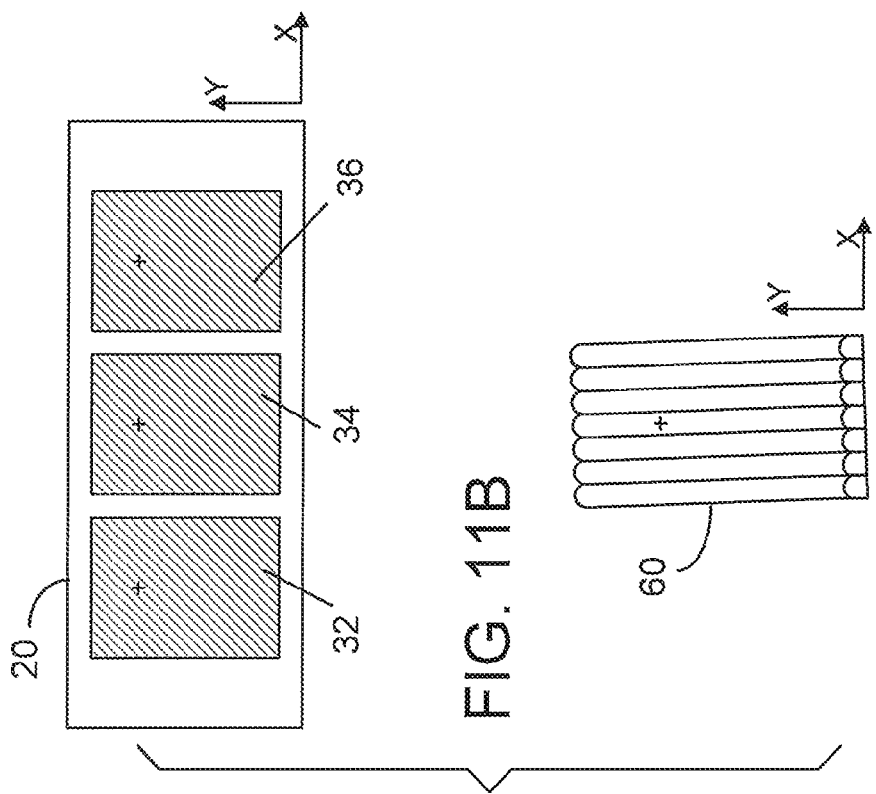
FIG. 11A shows the tilting of the display device in order to reduce the Moire Effect, according to one embodiment of the present invention.
Figure 11B:
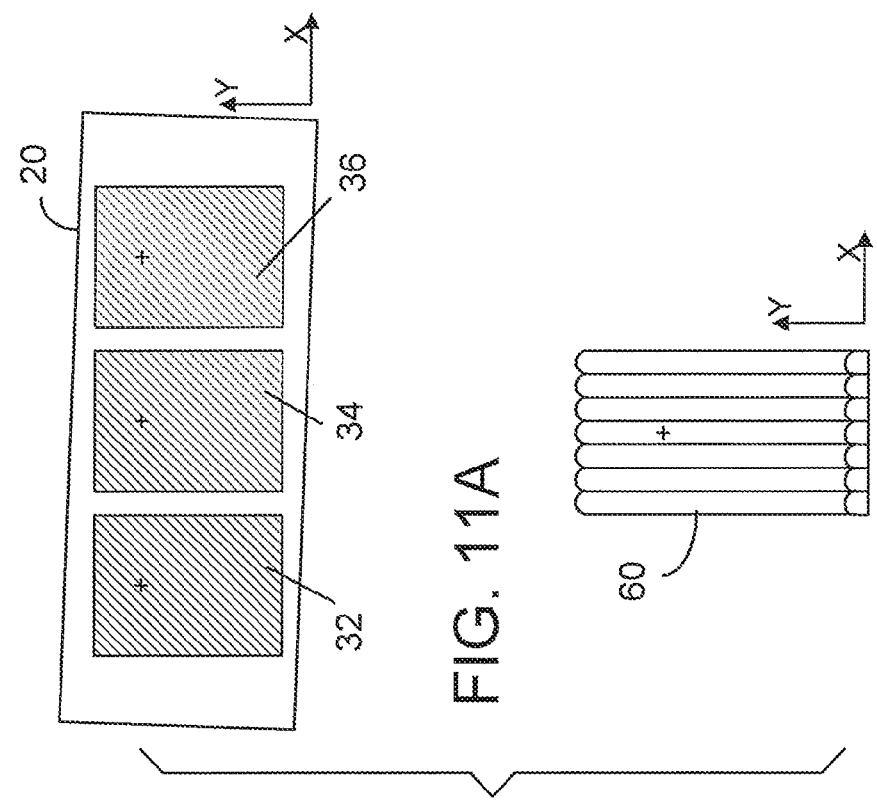
FIG. 11B shows the tilting of the print material in order to reduce the Moire Effect, according to another embodiment of the present invention.

Another way to fill the gaps in a 3D photo is to increase the number, N, of images to be exposed such that N=$\theta$/$\Delta\theta$. For example, if two images 32 and 34 are used to compose a 3D photo (see FIG. 10A) but the two compressed images do not properly fill the entire base of the lenticules, it is possible to increase the number of the displayed images to four in order to increase the number of compressed images to four. In the embodiment as shown in FIG. 10B, the image 32 is repeatedly displayed at the first location and the second location and then the image 34 is repeatedly displayed at the third location and the fourth location. Now the aperture of the optical image forming device is adjusted so that N=$\Delta\theta$=$\theta$/4. As such, the display device 20 can be stationary relative to the optical image forming device 40 and only the print material is laterally shifted in order to change the projection angles (see FIGS. 2A-2C). FIG. 10C shows It should be noted that, the digital display device 20 is generally composed of a two-dimensional arrays of pixels for displaying a digital image. The pixels are organized in columns and rows (not shown). For example, the rows are parallel to the Y axis and the columns are parallel to the X axis, as shown in FIG. 11B. It should also be noted that a lenticular screen is composed of a plurality of cylindrical lenses or lenticules. If the longitudinal axis of the cylindrical lenses is also parallel to the Y axis, then a Moire pattern may appear in the 3D photo. In order to reduce the Moire effect, it is possible to tilt the print material slightly so that the longitudinal axis of the lenticules is no longer parallel to the Y axis, as shown in FIG. 11B. In another embodiment of the present invention, instead of tilting the print material 60, the display device 20 is slightly tilted, as shown in FIG. 11A.

In a different embodiment of the present invention, as shown in FIG. 12, the optical image forming device 40 comprises a plurality of projection lenses or enlarging lenses 42. Each of the enlarging lenses 42 is fixedly located so that a plurality of images 32, 34, 36 and 38 can be exposed onto the print material 60 at different projection angles. In this embodiment, all the images can be simultaneously displayed on the display device 20. The print material 60 is kept stationary relative to the display device 20 and the optical image forming device 40 during the entire composition process. If the projection lenses 42 cannot be arranged such that the compressed images of images 32, 34, 36 and 38 cannot fill the entire lenticule base (see FIG. 4), it is possible to fill the gaps by electronically shifting the images 32, 34, 36 and 38 on the display device 20 and mechanically moving the print material 60 in opposite directions (see FIG. 9C).

Figure 13:
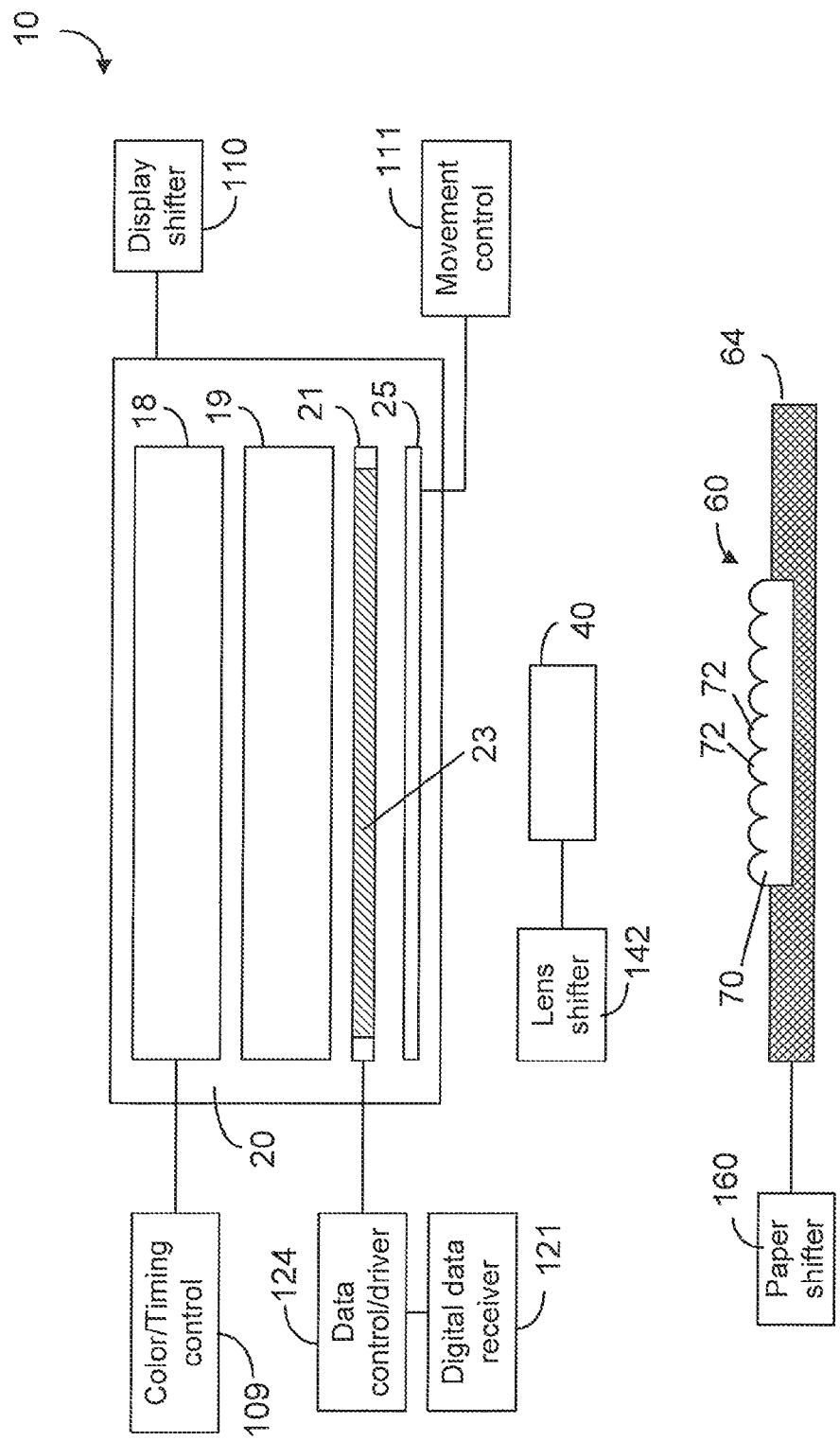
FIG. 13 shows various components in the 3D photographic printer, according to one embodiment of the present invention.

FIG. 13 shows an apparatus for making 3D photographs, according to one embodiment of the present invention. The apparatus 10, may be referred to as a 3D printer, comprises a display device 20, an optical image forming device 40 and a holder 64 to hold a print material 60. The display device 20 comprises a digital data receiver 121 configured to receive digital image data and a data control/driver 124 configured to select and provide at least part of the received digital image data for 3D printing. As shown in FIG. 13, the display device 20 has a digital display panel 21 having an image display area 23 arranged to display one or more images indicative of the received digital image data, and a light source 18 to provide illumination to the digital display panel 21. Under the control of the data control/driver 124, the images may be displayed at one fixed location or displayed at a plurality of locations, depending on the embodiments of the present invention. The digital display panel 21 can be a liquid crystal display (LCD), for example. In one embodiment of the present invention, each of the images for composing a 3D photograph has a plurality of color image components, such as red, green and blue image components. For providing illumination for printing a color 3D photograph, the light source 18 also has a plurality of corresponding color light components, such as red, green and blue light components.

In one embodiment of the present invention, the liquid crystal device comprises a monochrome display panel configured to display one of the color image components at a time. In order to provide the corresponding one of the color light components to illuminate the monochrome display panel, a color/time control 109 may be used to select the corresponding color light component for illumination in a predetermined exposure period. For example, if a 3D photograph is composed of four projected images of four images formed at four different projection angles and each image has red, green and blue image components, then the printing may require twelve separate exposures. At each of the four projection angles, the monochrome display panel is arranged to separately display, one at a time, the red, green and blue image components of a different one of the four images, and the light source separately provides corresponding red, green and blue light components, each light component provided at a predetermined exposure period.

In one embodiment of the present invention, the print material 60 comprises a lenticular sheet 70 having a plurality of lenticules 72 facing the optical forming device 40. The print material 60 also has a photosensitive layer or emulsion 80 adjacent to the bottom side of the lenticular sheet 70 (see FIG. 3C, for example). As known in the art, the photosensitive layer or emulsion 80 is used to form latent images, which can turn into visible images after being chemically processed in a photographic developing procedure, for example (see FIG. 18). In general, the color sensitivity of the photosensitive emulsion 80 is color dependent. Thus, each of the color light components may have a different exposure time, which can be selected and controlled by the color/time control 109.

As shown in FIG. 13, the display device 20 may have a condenser 19 that is used to focus the light produced by the light source 18 on the digital display panel 21. Thus, the condenser 19 may intensify the illumination provided to the digital display panel 21 and/or make the illuminating beam more even.

According to various embodiments of the present invention, one or more of the display device 20, the optical image forming device 40 and the print material 60 may be mechanically shifted to various positions during the 3D printing process for achieving different projection angles, for example. Thus, the apparatus 10 a display shifter 110, a lens shifter 142 and a paper shifter 160 arranged to mechanically move the display device 20, the optical image forming device 40 and the paper holder 64 in a coordinated way. Each of the mechanical shifters can have a stepping motor or a servo motor, for example. In a different embodiment of the present invention, the display device 20, the optical image forming device 40 and the print material 60 may be mechanically linked so that these apparatus components can be shifted proportionally in their respective planes as shown in FIG. 15.

Figure 16A:
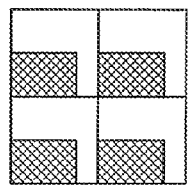
FIG. 16A illustrates blank spaces in pixels in an image.

In some digital display panel 21, the pixel area in each of the pixels may not be substantially utilized such that when an image is displayed on the panel, there are inactive spaces or gaps between adjacent pixels. As a result, the projected image may also show blank spaces or gaps between adjacent pixels (see FIG. 16A). In order to improve the viewing quality of the 3D photograph, it may be desirable to at least partially fill in those blank spaces or gaps. Thus, in one embodiment of the present invention, an optical material 25 is provided between the display panel 21 and the optical image forming device 40 (or between the optical image forming device 40 and the print material 60) for pixel filling purposes (see FIGS. 16A, 16B and FIG. 17 and the description thereof). The optical material is connected to a movement control 111 for movement.

As illustrated in FIGS. 2A-2C, during the 3D photo composing process, the projection angles must be changed in order to fill the lenticule base with compressed images 82, 84, . . . (see FIGS. 3A-3C). According to embodiments of the present invention, the projection angles can be changed by changing the location of the print material 60 and the location of the optical image forming device 40 in relation to the location of the displayed image on the display panel in the display device 20. There are at least five ways to achieve the different projection angles.

1) Keeping the print material 60 stationary and laterally shifting the display device 20 and the optical image forming device 40 by proportionally different distances as shown in FIG. 14A. At different projection angles, different images 32, 34 and 36 are displayed at substantially the same location on the display panel in order to form different compressed images 82, 84, 86 in each of the lenticules 72 in the 3D photograph.

2) Keeping the print material 60 stationary and laterally shifting the display device 20 and the optical image forming device 40 by same distances as shown in FIG. 14B. At different projection angles, different images 32, 34 and 36 are displayed at different locations on the display panel in order to form different compressed images 82, 84, 86 in each of the lenticules 72 in the 3D photograph.

3) Keeping the display device 20 stationary and laterally shifting the print material 60 and the optical image forming device 40 by proportionally different distances as shown in FIG. 14C. At different projection angles, different images 32, 34 and 36 are displayed at substantially the same location on the display panel in order to form different compressed images 82, 84, 86 in each of the lenticules 72 in the 3D photograph.

4) Keeping both the display device 20 and the optical image forming device 40 stationary and laterally shifting the print material 60 to proportionally different locations as shown in FIG. 14D. At different projection angles, different images 32, 34 and 36 are displayed at different locations on the display panel in order to form different compressed images 82, 84, 86 in each of the lenticules 72 in the 3D photograph.

5) Keeping the optical image forming device 40 stationary and laterally shifting the print material 60 and the display device 20 by proportionally different distances as shown in FIG. 14E. At different projection angles, different images 32, 34 and 36 are displayed at substantially the same location on the display panel in order to form different compressed images 82, 84, 86 in each of the lenticules 72 in the 3D photograph.

To facilitate the shifting of the different components in their respective planes, the display device 20, the optical image forming device 40 and the print material 60 (fixedly located on a holder 64) can be linked to different shifting devices as shown in FIG. 13. Alternatively, these components can be linked to a proportional lever and driven by a common stepping motor or servo motor (not shown). In this setup, two of the three components can be relatively shifted at the same time. As shown in FIG. 15, the print material 60 is kept stationary while the display device 20 and the optical image forming device 40 are shifted to proportionally different distances on their respective planes.

Figure 16B:
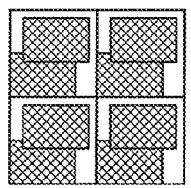
FIG. 16B illustrated at least part of the blank spaces in pixels are eliminated.
Figure 17:
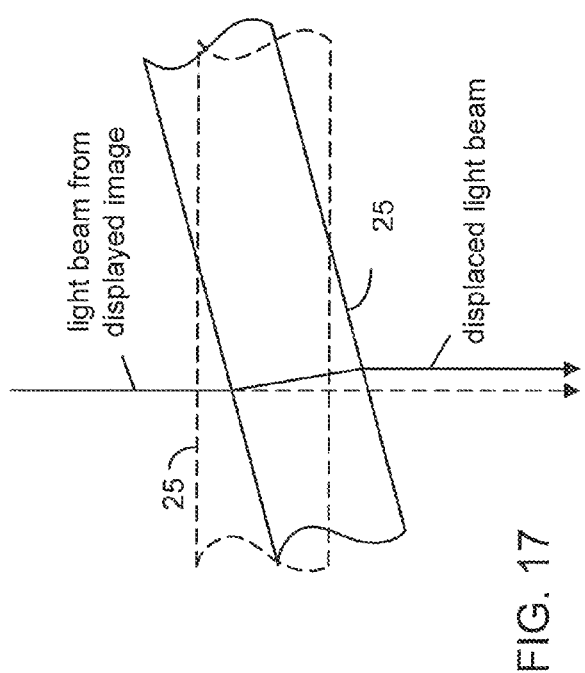
FIG. 17 illustrates an image interpolation method, according to one embodiment of the present invention.

In some digital display panel 21, the pixel area in each of the pixels may not be substantially utilized such that when an image is displayed on the panel, there are inactive spaces or gaps between adjacent pixels. As a result, the projected image may also show blank spaces or gaps between adjacent pixels (see FIG. 16A). In order to improve the viewing quality of the 3D photograph, it may be desirable to at least partially fill in those blank spaces or gaps. Thus, in one embodiment of the present invention, an optical material 25 is used for pixel filling purposes. For example, the optical material 25 can be a sheet of clear material, such as plastic or glass, or a polarizer sheet. For pixel filling purposes, the optical material 25 can be tilted so as to displace the light beam in a controlled amount by refraction as shown in FIG. 17, for example. As a result, the blank spaces or gaps in the pixels are reduced as shown in FIG. 16B.

Figure 18:
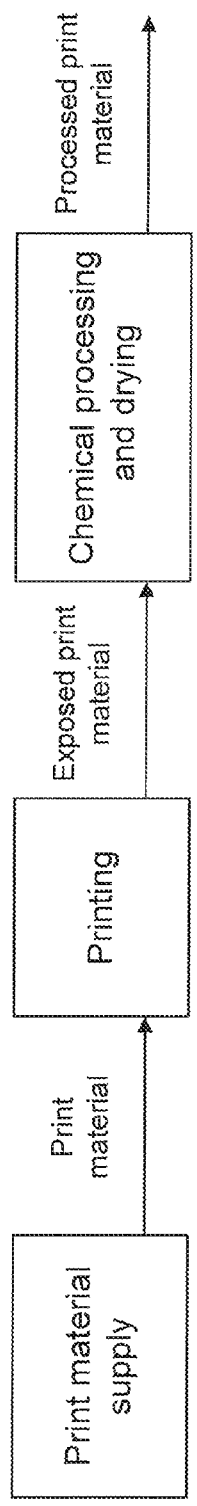
FIG. 18 is a block diagram showing a 3D printing process, according to one embodiment of the present invention.

In one embodiment of the present invention, the print material 60 comprises a lenticular screen or sheet 70, a photosensitive emulsion 80 and a supporting or backing layer 90 (see FIG. 3A, for example). The backing layer 90 can be porous so as to allow processing chemicals to pass through in order to process the latent images into visible images. The print material can come in as a roll of sheet in a print material supply as shown in FIG. 18. The print material is provided to a printing station for printing. The printing station may have one or more apparatus 10 as shown in FIG. 13 for printing one 3D picture, or two or more 3D pictures at the same time. After 3D printing, the exposed print material (with latent images) is conveyed to a chemical processing station for photographic developing and drying. The processed print material in a sheet form is cut into individual 3D photographs. In a different embodiment, the print material in a sheet form can be cut into individual pieces before printing.

As shown in FIG. 5, the display device 20 is located on a first plane, the enlarging lens, projection lens or optical image forming device 40 is located on a second plane, and the print material is located on a third plane. It should be noted that the shifting of the components on these three planes is relative. For example, in the printing method as shown FIGS. 2A-2C, it is possible to keep the display device 20 and the optical image forming device 40 stationary, while shifting the print material 60 on the third plane so that the displayed images can be exposed onto the print material at various projection angles. In this example, only the component on one plane is shifted. It is also possible to keep the print material 60 stationary, while shifting the display device 20 on the first plane together with the optical image forming device 40 on the second plane. In this example, the components on two planes are shifted.

In the gap-filling method as shown in FIG. 9A, it is possible to keep the display device 20 on the first stationary while shifting the optical image forming device 40 on the second plane and shifting the print material 60 on the third plane. It is also possible to keep the optical image forming device 40 on the second plane stationary while shifting the display device 20 on the first plane and shifting the print material 60 on the third plane. In the above-described two examples, the components on two planes are shifted. However, it is possible that the components on three planes are shifted.

Thus, although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. A method, comprising:
arranging a digital display device comprising an image display area on a first plane;
arranging an optical image forming device on a second plane spaced from the first plane;
receiving digital image data in the digital display device; and
displaying a plurality of images on the image display area for forming a plurality of projected images on a print material through the optical image forming device, wherein said plurality of images are indicative of the digital image data, and each of said plurality of projected images is caused to form on the print material at different projection angles, wherein the print material is located on a third plane spaced from the second plane and substantially parallel to the first plane, such that the second plane is located between the first plane and the third plane, wherein the digital display device comprises:
a liquid crystal display device comprising the image display area and a light source, said method further comprising:
arranging the light source to provide illumination to the image display area for forming each of said plurality of projection images, wherein each of the images comprises a plurality of color image components, wherein the liquid crystal display device comprises a monochrome display panel arranged to display one of the plurality of color image components at a time and wherein the light source comprises a plurality of color light components corresponding to the color image components, said method further comprising:
selecting a corresponding of the plurality of color light components to illuminate the monochrome display panel for a predetermined exposure period when the monochrome display panel displays one of the color image components.

2. The method of claim 1, further comprising:
shifting the print material on the third plane for achieving the, different projection angles.

3. The method of claim 2, wherein the digital display device remains stationary relative to the optical image forming device.

4. The method of claim 1, wherein each of the plurality of projected images comprising an alignment point, said method further comprising:
shifting at least one of the plurality of images on the image display area such that the plurality of projected images area are aligned on the print material at the alignment point.

5. The method of claim 1, further comprising:
shifting the optical image forming device on the second plane and shifting the images on the first plane relative to the print material for achieving different projection angles.

6. The method of claim 1, wherein the plurality of color image components comprise a red image component, a green image component and a blue image component and the corresponding color light components comprise a red light component, a green light component and a blue light component.

7. The method of claim 1, wherein the light source comprises light-emitting components arranged to emit light for providing the color light components.

8. The method of claim 1, wherein the print material comprises a plurality of lenticules, each of the lenticules having a lenticule base, and wherein each of the projection images is caused to form a different compressed image having a compressed image width at a different section of the lenticule base, said method further comprising
  adjusting each of the different projection angles for extending the compressed image width at the different section of the lenticule base.

9. The method of claim 8, wherein said adjusting comprises shifting at least two of the digital display device, the optical image forming device and the printed material.

10. The method of claim 8, wherein said adjusting comprises mechanically shifting one or both of the optical image forming device and the printed material and electronically shifting the images on the image display area.

11. The method of claim 1, thither comprising mechanically shifting at least two of the digital display device, the optical image forming device and the printed material for achieving the different projection angles.

12. The method of claim 1, further comprising mechanically shifting one or both of the optical image forming device and the printed material and electronically shifting the images on the image display area for achieving the different projection angles.

13. The method of claim 1, wherein the optical image forming device comprises a single aperture, said method further comprising adjusting the single aperture such that each of the projected images is formed through said single aperture.

14. The method of claim 1, wherein said different projection angles comprise at least a first projection angle and a second projection angle; said plurality of projected images comprise at least a first projected image and a second projected image; and said plurality of images comprises at least a first image for forming the first projected image at the first projection angle, and a second image for forming the second projected image at the second projection angle, such that the plurality of color image components of the first image are arranged for projection one at a time at the first projection angle, and the plurality of color image components of the second image are arranged for projected one at a time at the second projection angle, and wherein the predetermined exposure period is determined at least partly based on a sensitively of the print material to the corresponding one of the plurality of color light components.

15. A method, comprising:
  arranging a digital display device comprising an image display area on a first plane;
  arranging an optical image forming device a second plane spaced from the first lane:
  receiving digital image data in the digital display device; and
  displaying a plurality of images on the image display area for forming a plurality of projected images on a print material through the optical image forming device, wherein said plurality of images are indicative of the digital image data and each of said plurality projected images is caused to form on the print material at different projection angles, wherein the print material is located on a third plane spaced from the second plane and substantially parallel to the first plane, such that the second plane is located between the first plane and the third plane, wherein the digital display device comprises:
  a liquid crystal digital device comprising the image display area and a light source, said method further comprising:
    arranging the light source to provide illumination to the image display area for forming each of said plurality of projection images, wherein the print material comprises a lenticular sheet having a first side facing the optical image forming device and an opposing second side, a backing layer adjacent to the second side, and a photosensitive layer located between the lenticular sheet and the backing layer, said method further comprising causing the photosensitive layer to form latent images of said plurality of projected images; and chemically processing the print material for changing the latent images to visible images, wherein the backing layer is porous so as to allow processing chemicals to pass through the backing layer to reach the photosensitive layer for said chemically processing.

16. A method, comprising:
  arranging a digital display device comprising, an image display area on a first plane;
  arranging an optical image forming device on a second plane spaced from the first plane:
  receiving digital image data in the digital display device: and
  displaying a plurality of images on the image display area for forming a plurality of projected images on a print material through the optical image forming device, wherein said plurality of images are indicative of the digital image data, and each of said plurality of projected images is caused to form on the print material at different projection angles, wherein the print material is located on a third plane spaced from the second plane and substantially parallel to the first plane, such that the second plane is located between the first plane and the third plane, wherein the digital display device comprises:
  a liquid crystal digital device comprising the image display area and a light source said method further comprising:
    arranging the light source to provide illumination to the image display area for forming each of said plurality of protection images, wherein each of the images comprises a plurality of color image components, wherein the liquid crystal display device comprises a monochrome display panel arranging to display one of the plurality of color image components at a time and wherein the light source comprises a plurality of color light components corresponding to the color image components, said method further comprising:
    selecting a corresponding one of the plurality of color light components to illuminate the monochrome display panel for a predetermined exposure period when the monochrome display panel display one of the color image components, wherein the monochrome display panel comprises a plurality of discrete pixels and each of said plurality of the projected images formed on the print material comprises image dots corresponding to the discrete pixels, said method further comprising optically widening the image dots.

17. The method of claim 16, wherein the illumination provided to the image display area is arranged to form an image forming light beam through the optical image forming device for forming each of said plurality of projected images, said optical widening comprises arranging a sheet of optical material between the digital display device and the optical image forming device, and mechanically moving the sheet of optical material in a predetermined manner while the illumination is provided to the image display area so as to shift the image forming light beam.

18. The method of claim 16, wherein said different projection angles comprise at least a first projection angle and a second projection angle; said plurality of projected images comprise at least a first projected image and a second projected image; and said plurality of images comprises at least a first image for forming the first projected image at the first projection angle, and a second image for forming the second projected image at the second projection angle, such that the plurality of color image components of the first image are arranged for projection one at a time at the first projection angle, and the plurality of color image components of the second image are arranged for projected one at a time at the second projection angle, and wherein the predetermined exposure period is determined at least partly based on a sensitively of the print material to the corresponding one of the plurality of color light components.

* * * * *

UNITED STATES PATENT AND TRADEMARK OFFICE
CERTIFICATE OF CORRECTION

Page 1 of 1

PATENT NO. : 8,805,179 B2
APPLICATION NO. : 13/928885
DATED : August 12, 2014
INVENTOR(S) : Allen Kwok Wah Lo It is certified that error appears in the above-identified patent and that said Letters Patent is hereby corrected as shown below:

In the Claims,

In column 12 at line 37 (claim 1, line 32), after "corresponding" --one-- should be inserted.

In column 13 at line 17 (claim 11, line 1), "thither" should be --further--.

In column 13 at line 51 (claim 15, line 5), "lane" should be --plane--.

In column 14 at line 20 (claim 16, line 5), ":" should be --;--.

In column 14 at line 21 (claim 16, line 6), ":" should be --;--.

In column 14 at line 34 (claim 16, line 19), "digital" should be --display--.

In column 14 at line 35 (claim 16, line 20), after "source" --,-- should be inserted.

In column 14 at line 41 (claim 16, line 26), "arranging" should be --arranged--.

In column 14 at line 49 (claim 16, line 34), "display" should be --displays--.

Signed and Sealed this
Sixteenth Day of December, 2014

Michelle K. Lee
*Deputy Director of the United States Patent and Trademark Office*